United States Patent [19]

Barnette

[11] Patent Number: 4,861,636

[45] Date of Patent: Aug. 29, 1989

[54] FEEDSTOCK LAMINATION

[75] Inventor: C. Joseph Barnette, Akron, Ohio

[73] Assignee: Kent Adhesive Products Company, Kent, Ohio

[21] Appl. No.: 178,599

[22] Filed: Apr. 7, 1988

[51] Int. Cl.[4] ........................ B32B 3/10; B32B 7/06; B32B 7/12

[52] U.S. Cl. ........................ 428/41; 428/136; 282/12 A; 281/5

[58] Field of Search ........................ 428/41, 136, 138; 282/11.5 A, 11.5 R, 12 R, 12 A, DIG. 2; 281/5

[56] References Cited

U.S. PATENT DOCUMENTS 3,546,053 12/1970 Goldberg et al. .................... 428/41
4,544,590 10/1985 Egan .................... 428/41

*Primary Examiner*—Alexander S. Thomas
*Attorney, Agent, or Firm*—Renner, Kenner, Bobak, Taylor & Weber

[57] ABSTRACT

Laminates are taught which are useful as feedstocks in microprocessor-controlled, electromechanical drawing devices. The type of feedstock laminates disclosed comprise a carrier substrate whose upper surface has been coated with a pressure sensitive adhesive, and masked with a protective cover. The protective cover is subdivided into panel strips which can be removed to expose the substrate's adhesive layer. Any desired pattern material can then be cohered to the adhesive, and a desired design insised therein with the electromechanical drawing device. Thereafter, the design is removed from the substrate and used for the purpose for which it was intended.

1 Claim, 2 Drawing Sheets

FEEDSTOCK LAMINATION

TECHNICAL FIELD

This invention relates to electromechanical drawing devices controlled by electronic microprocessors. More particularly, this invention relates to feedstock materials used by such devices to produce a broad range of graphic materials. Specifically, this invention relates to laminated feedstock materials provided with covering or protective panel strips whose removal allows pattern material to be cohered to an underlying carrier substrate which has been coated with a pressure-sensitive adhesive, and designs cut, traced, or ponced from the material.

BACKGROUND

Graphics, including designs, patterns, letters and the like are associated in one way or another with almost all commercial endeavors. In addition, graphic materials, "graphics", are widely used in most other facets of human activity as well. The production of graphic creations has been the subject of considerable effort over the years, and a myriad of processes and devices have been devised to respond to society's need to generate the same. As a result, the graphic systems available today range from those of the fully automated type, capable of handling large volume output, to o systems relying largely on manual manipulation, useful for smaller volumes.

In the relatively recent past, a method for producing graphic materials based on the use of electromechanical drawing devices has been discovered, and the same are being employed in conjunction with microprocessor controls to generate a wide variety of graphic products. Such devices enable graphics to be designed, revised, and automatically reproduced with great ease. An example of such a device is that sold by Gerber Scientific Products, Inc. of Manchester, Conneticut, marketed under the trademark "Graphix 4". Electromechanical drawing devices lend themselves especially well to single product, or small run graphic production of the customized or "boutique" variety. Such systems are capable, however, of being used for much larger runs. To a large extent, the use of microprocessor controlled electromechanical drawing devices eliminates the time-consuming manual operations frequently involved in the developmental evolution of graphic designs. Furthermore, such devices accomodate a wide variety of feedstock materials, and thus respond to a wide variety of graphic needs.

Such devices have many advantages for small users, particularly those with little or no need for a wide variety of graphic products. In instances where the user is involved in producing a broadly diverse line of products, however, such systems have up to now had the disadvantage of requiring the availability of a fairly extensive range of feedstock materials, greatly increasing inventory requirements and associated costs. A further disadvantage to such users arises from the fact that the required pattern materials are not always available in the form of a feedstock which the devices can handle. In addition, even where it is possible to purchase an uncommon feedstock, exorbitant time, effort, and cost is often involved in procuring it.

DISCLOSURE OF THE INVENTION

In view of the preceding, therefore, it is a first objective of this invention to provide an improved, versatile feedstock which is compatible with a user's need for a wide variety of different graphic products.

It is a second objective of the invention to reduce the extent of inventory needs for users of electromechanical drawing devices, where such users have a need for a broad range of graphic products.

Another object of the invention is the provision of a "generic" type feedstock laminate which obviates the need to develop sources of supply for new feedstock materials in instances where a new graphic product is required.

Another object of this invention is the provision of feedstock materials which minimize inventory costs and increase the rapidity with which new graphic products can be produced.

The foregoing and other objects are provided by a laminated feedstock for a microprocess-or-controlled, precision, electromechanical drawing device comprising:

a carrier substrate sheet whose upper surface is coated with a pressure-sensitive adhesive, and a protective cover sheet whose lower surface is coated with a release agent, wherein said upper and lower surfaces are in cohering contact with each other, thereby forming a lamination, and wherein said cover sheet includes at least one removeable panel strip bounded by slits disposed therein formed by scoring said cover sheet parallel to the longitudinal axis thereof, and wherein further, said lamination is perforated with a plurality of spaced transport holes adjacent to each of its longitudinal edges.

The foregoing and still other objectives of the invention are provided by the process of placing a laminated feedstock according to the preceding paragraph from which at least one of said panel strips has been removed in a microprocessor-controlled, precision, electromechanical drawing device; placing pattern material into cohering contact with the pressure sensitive adhesive on said carrier substrate sheet exposed by the removal of said strips; using said device to cut out, trace, or ponce a desired design in said pattern material, and thereafter removing said pattern material from said carrier substrate sheet.

BRIEF DESCRIPTION OF THE DRAWINGS

The invention described herein will be better understood when reference is had to the following drawings, in which like numbers reference like parts.

BEST MODE FOR CARRYING OUT THE INVENTION

Figure 1:
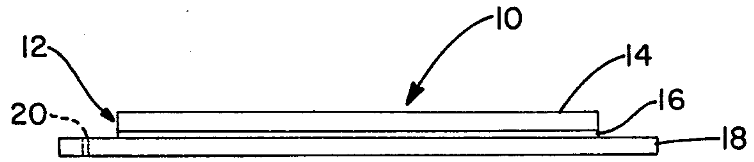
FIG.-1 Prior Art
FIG. 1 is an end view of a feedstock laminate of the prior art.

FIG. 1 is an end view of a feedstock laminate of the prior art, indicated generally by the numeral 10. Laminate 10 consists of a pattern material, generally 12, which includes a film layer 4 which has a pressure sensitive adhesive layer 16 coated on the bottom thereof. The pattern material 12 is attached by adhesive layer 16 to a carrier substrate sheet 18, which has transport holes 20 disposed therein.

The microprocessor controlled electromechanical drawing device accepts instructions entered through an alphanumeric keyboard and an array of function buttons which cause the tools held by the device to reproduce designs or characters from any of a number of fonts or other information stored in the device by tracing, perforating, or cutting the feedstock laminate which is transported through the machine. The tool holder of the device optionally accepts a ballpoint pen, a perforator for poncing paper patterns, or a scrolling knife for cutting.

Figure 2:
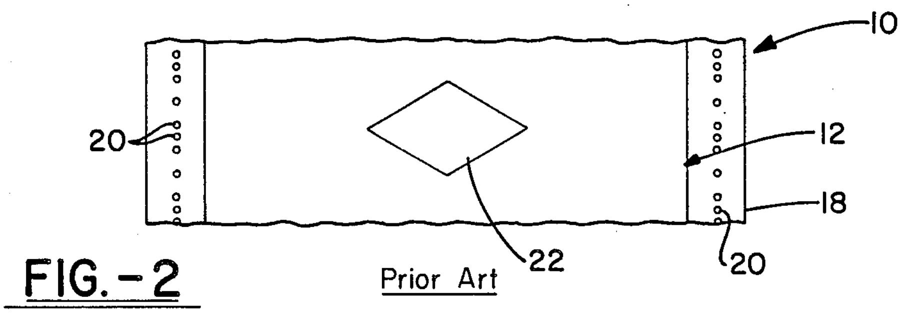
FIG.-2 Prior Art
FIG. 2 is a plan view of the prior art feedstock laminate of FIG. 1 with a design incised in the pattern material forming the top layer thereof.

FIG. 2 is a plan view of the prior art feedstock laminate, generally 10, showing the carrier substrate 18, perforated with transport holes 20, which in cooperation with a toothed transport gear associated therewith, allow the feedstock laminate to be moved through the electromechanical drawing device. As illustrated in the Figure by the incised diamond pattern, generally 22, the device can be used to generate typed letters, shapes, or other symbols in the pattern material 12 which can be removed and used for posters, displays, silk screen masters, presentation materials, or for other graphic-related uses.

Figure 3:
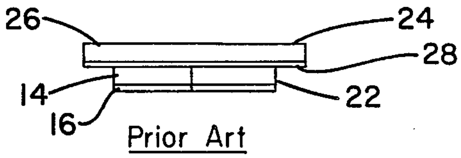
FIG.-3 Prior Art
FIG. 3 shows an end view of a pattern transfer tape in the process of removing an incised pattern component from the feedstock laminate of the prior art.

FIG. 3 shows an end view of a pattern transfer tape being used to remove an incised pattern component from a feedstock laminate of the prior art. In the removal process a pattern transfer tape 24, comprising a film layer 26 whose bottom surface is coated with a pressure sensitive adhesive layer 28, is pressed against the upper surface of the incised pattern component 22. The transfer tape 24 is thereupon pulled away from the feedstock laminate 10, carrying with it the incised pattern component 22, comprising the film layer 14 with a pressure sensitive adhesive layer 16 coated on the bottom surface thereof. Having been removed, the pattern component 22, together with any additional pattern components associated therewith, can be transported, to any substrate on which it is desired to place the components while maintaining their spatial relativity. At that point, the transfer tape 24, with its attached pattern components 22 is pressed against the substrate and the pattern transfer tape peeled away peeled away, leaving the pattern components adhesively attached to the substrate. The relative coherent strengths of layers 16 and 28 are selected so that the transfer tape 24 can be separated from film layer 14 without disrupting the bond between adhesive layer 16 and the substrate on which it is placed.

While the feedstock of the prior art described, and the process of developing graphics through its use, provide graphic displays of high quality, it is apparent that the nature of the graphic product produced will depend upon the nature of film layer 14 employed. Stated another way, any specific feedstock laminate produces a specific graphic product whose nature will depend upon the characteristics of the laminate from which it is made.

Figure 4:
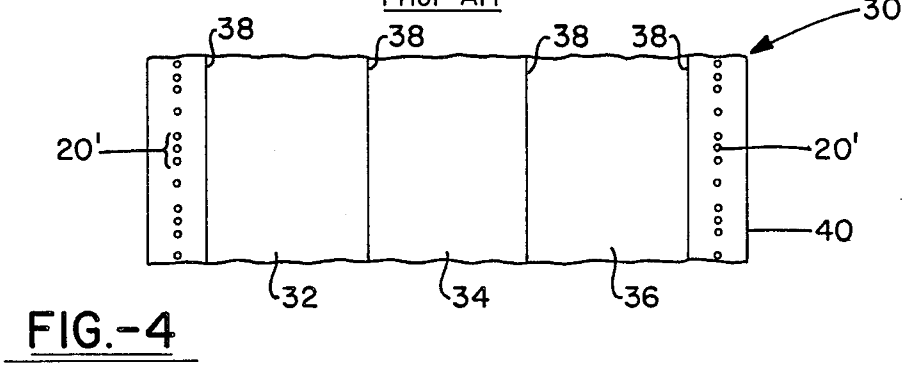
FIG. 4 is a plan view of a feedstock laminate of the invention.

FIG. 4 is a plan view of a feedstock laminate of the invention, generally 30, showing a protective cover sheet 40 provided with removeable panel strips 32, 34, and 36 by slits or scoring 38 which sever the cover sheet into the panels shown. Also illustrated in the Figure are the feedstock laminate transport holes 20', similar to those in the laminate of the prior art. While the dimensions of the feedstock laminate will depend upon the design of the drawing device with which the feedstock is used, in the case of feedstock employed with the drawing device referred to by way of example, in the preceding, the feedstock will generally be about 15 inches wide, with the transport holes 20' located approximately ¼ inch from each side. Similarly, the width of the panels may also be varied as desired; however, with feedstock having the dimensions described, the panels will ordinarily be from about 4 to 5 inches wide.

Although the Figure illustrates a feedstock 30 having three panels, a different number, for example, from about one to three may conveniently be provided, depending upon the use to which the feedstock is to be put.

Figure 5:
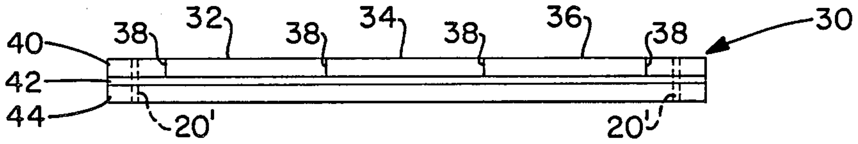
FIG. 5 is an end view of a feedstock laminate of the invention, as shown in FIG. 4.

FIG. 5 is an end view of the feedstock lamination of the invention, particularly as illustrated in FIG. 4. The Figure shows the feedstock laminate 30, with panels 32, 34, and 36 disposed thereon, having been formed by slitting or scoring the protective cover sheet 40 to provide slits 38. The protective cover sheet 40, including panels 32, 34 and 36, are held against the carrier substrate 44 by a pressure-sensitive adhesive layer 42, of the kind well-known in the art, coated on the upper surface of the carrier substrate. The transport holes 20' penetrate the entire lamination, as shown.

In a preferred embodiment, the lower surface of the protective cover sheet 40 is coated with a release agent, for example, a silicone containing material, also of the kind well known in the art to facilitate removal of the desired panels from the pressure sensitive adhesive layer 42.

The thickness of the feedstock laminate components may be varied to suit the requirements of use; however, ordinarily a carrier substrate 44 and the protective cover sheet 40 will have about the same thickness, commonly, approximately 0.003 to 0.004 inch, while the adhesive layer will often be about 0.005 inch thick.

Figure 6:
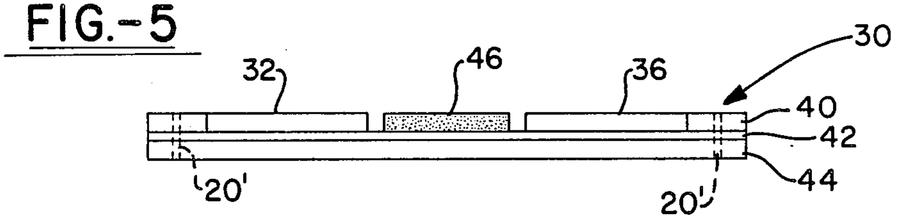
FIG. 6 is an end view of a feedstock laminate of FIG. 4, in which, however, a protective cover panel strip has been removed, and a selected pattern material substituted therefore.
Figure 7:
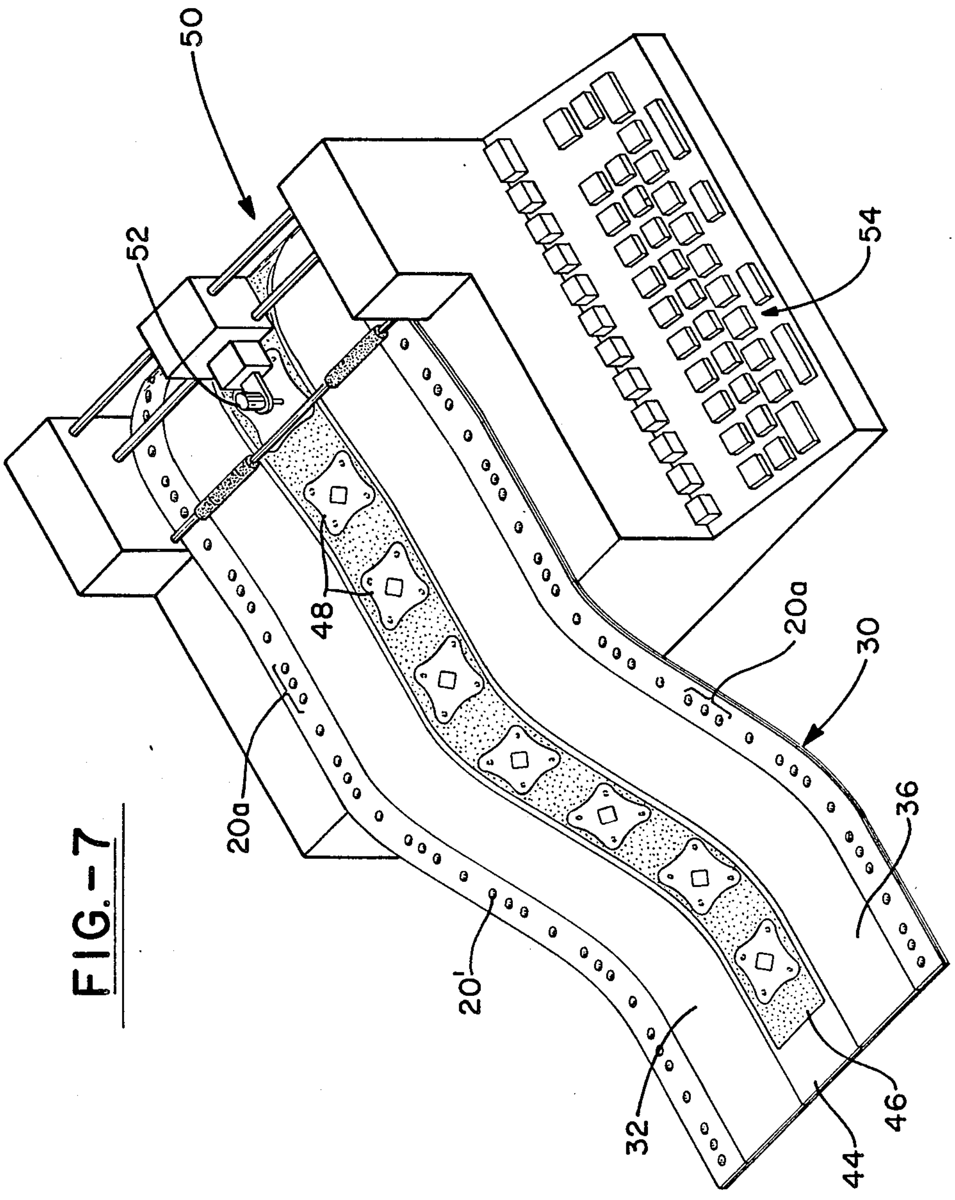
FIG. 7 is an isometric view of an electromechanical drawing device processing selected pattern material which has been incorporated onto the feedstock laminate of the invention.

FIG. 6 shows an end view of the feedstock laminate of FIG. 4 in which a protective panel strip has been removed, and a selected pattern material substituted therefore. The Figure shows the feedstock laminate 30 on which the protective cover sheet 40, including removeable protective cover panel strip 32 and 36 are attached to carrier substrate 44 by the pressure sensitive adhesive layer 42 coated on the carrier substrate. The center panel 34 has been removed, and pattern material 46 has been substituted therefore, the latter being held securely by the exposed pressure sensitive adhesive layer 42. The transport holes 20' are shown disposed adjacent the edges of the feedstock laminate 30.

The invention provides a significant advantage over prior art feedstocks in that any of a wide range of pattern materials can be processed in the electromechanical drawing device utilizing the same feedstock laminate. For example, after removal of a protective cover panel strip, pattern materials employed may include any of such things as sheet of cork, polyesters, foams, vinyls, velours, and the like. The drawing device may then be used to manufacture gaskets, graphic designs, including pictures and letters, templets, stencils, and many other articles.

As previously mentioned, such versatility is in sharp contrast to the prior art feedstock materials, which only allow a single pattern material to be processed for any given feedstock laminate used.

Although other materials could conceivably be employed, the use of paper is preferred in making the carrier substrate and protective cover sheet.

FIG. 8 is an isometric view of the electromechanical drawing device processing selected pattern material that has been incorporated onto the feedstock laminate of the invention. As shown, the drawing device, generally 50, is being fed with a feedstock laminate 30 from which the center protective cover sheet has been removed, exposing the pressure sensitive coated carrier substrate 44. Protective cover panel strips 32 and 36 have been left in place. A pattern material, in the case of the Figure, a sheet of cork 46 has been cohered to the adhesive layer, and a scrolling knife 52 is shown being used to incise a gasket design 48 in the cork strip. The feedstock laminate is being moved through the drawing device by means of revolving gears which engage transport holes 20'. The feedstock laminate transport holes 20' are shown disposed in lines along the edges of the feedstock laminate 30, with clusters of holes **20*a* occurring periodically along the lines of holes. The alignment clusters 20*a* help maintain the tape in alignment even in those instances where wear from the teeth of the transport gear causes the transport holes 20' to assume an elliptical shape, resulting in undesirable "play" between such holes and the gear teeth. Instructions are provided to the machine by means of the control keyboard, generally 54**.

While in accordance with the patent statutes, a preferred embodiment and best mode has been presented, the scope of the invention is not limited thereto, but rather is measured by the scope of the attached claims.

What is claimed is:

1. A laminated feedstock for a microprocessor-controlled precision, electromechanical drawing device comprising:

a paper carrier substrate sheet whose upper surface is coated with pressure sensitive adhesive, and a protective cover sheet whose lower surface is coated with a release agent, wherein said upper and lower surfaces are in cohering contact with each other, thereby forming a lamination, and where said cover sheet includes at least one removable panel strip bounded by slits disposed therein formed by scoring said cover sheet parallel to the longitudinal axis thereof, said lamination being perforated with a plurality of spaced transport holes adjacent to each of its longitudinal edges, and wherein one of the said at least one removable panel strips has been removed and replaced with a second panel strip removably attached to said adhesive, said second panel strip being of a material different from said first panel strip.

* * * * *